2,871,246

PROCESS FOR 3-HYDROXY-6-ALKYL-5,16-PREGNADIEN-20-ONES AND ESTERS THEREOF

Bjarte Löken, Roosevelt, Puerto Rico, assignor to G. D. Searle & Co., Chicago, Ill., a corporation of Delaware No Drawing. Application May 28, 1958
Serial No. 738,305

5 Claims. (Cl. 260—397.4)

The instant invention relates to the preparation of 3β-hydroxy-6-alkyl-5,16-pregnadien-20-ones and their esters of the general structural formula

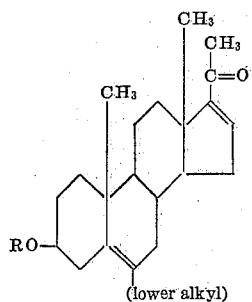

(lower alkyl)

In the foregoing structural formula the lower alkyl radical in the 6-position can be a straight-chain or branched propyl, butyl, amyl or hexyl group, but it is preferably a methyl or ethyl radical. The radical R can represent hydrogen or an acyl radical of a hydrocarbon carboxylic acid, preferably of less than 7 carbon atoms. Examples of such acyl groups are formyl, acetyl, propionyl, butyryl, valeryl and hexanoyl.

The foregoing compounds are progestationally active. They also serve as starting materials for the preparation of 6-alkylprogesterones and 6-alkyl-17α- hydroxyprogesterones and their 17-esters which are potent progestational agents.

The procedures in the literature for conversion of diosgenin or cholesterol to pregnadiene derivatives all suffer from serious disadvantages in specific steps of the reaction sequence. Actually only the first conventional step of isomerizing a 6-alkyldiosgenin to its corresponding pseudoderivative, 3β,26-diacetoxy-6-alkyl-5,20(22)-furostadiene can be conducted by a procedure analogous to that generally employed for diosgenin, namely reaction with acetic anhydride for 6 hours at 190–195° C. The subsequent steps of the sequence had to be altered materially and in some steps, as in cleavage of the δ-acetoxy-γ-methylpentanoyl ester, entirely different procedures had to be devised.

Thus, the second step, namely oxidation of the furostadiene to the 16-(δ-acetoxy-γ-methyl)pentanoate by chromium trioxide in an acetic acid medium is advantageously effected in the presence of a chloralkane solvent amounting to 15–60% by volume of the oxidation medium. The chlorinated solvents contemplated are the chlorinated hydrocarbons of one to three carbon atoms including, for example, ethylene chloride, chloroform, carbon tetrachloride, ethylene trichloride and propylene chloride. Effecting the oxidation in this manner facilitates recovery of the steroid from the reaction mixture. Thus the chromium salts and acetic acid are readily removed in aqueous phase while the 3-acyloxy-16-(δ-acetoxy-γ-methylpentanoyloxy)-5-pregnen-20-one stays in the chlorinated hydrocarbon organic phase; this ester can then be recovered by evaporating the chlorinated hydrocarbon.

The subsequent cleavage is effected by a novel solvolysis with at least three equivalents of alkali in aqueous acetone. A rapid reaction occurs with very strong alkali, e. g. caustic soda and potash. More time is needed with weaker bases such as the alkali metal carbonates. The acetone-water ratio can vary from about 1:3 to 3:1. The alkali, e. g. sodium hydroxide, can constitute from 1–20% by weight of the alkaline medium. The time period for the treatment is relatively short, ranging from about 5–60 minutes. Treatment temperatures are in the range of 20° C. to about 65° C. Temperature is relatively critical because two different results are attainable. In the lower range of about 20–33° C., cleavage of the substituted pentanoate results in a high yield of 3β-acyloxy-6-alkyl-5,16-pregnadien-20-one. On the other hand, in the range of about 45–65° C. there also occurs saponification of the 3-acylate to yield 3β-hydroxy-6-alkyl-5,16-pregnadien-20-one.

It is within the contemplation of the instant invention to carry out the same alkaline acetone-water treatment further at higher temperature to hydrolyze 3β-acyloxy-6-alkyl-5,16-pregnadien-20-one to 3-hydroxy-6-alkyl-5,16-pregnadien-20-one.

These compounds are valuable as key intermediates in the overall conversion of diosgenin into medically active 6-alkyl steroids. The 3β-hydroxy-6-alkyl-5,16-pregnadien-20-ones have certain advantages over their 3-esters as intermediates. Epoxidation to 3β-hydroxy-6-alkyl-16α,17α-epoxy-5-pregnen-20-ones can be effected by reaction with alkaline hydrogen peroxide in methanol solution to give a better yield. Also the 3-hydroxy compounds can be converted by the Oppenauer oxidation to the 6-alkyl-5,16-pregnadien-3,20-diones, then by Raney nickel reduction to progestationally active 6-alkylprogesterones or epoxidation as above outlined to the 16α,17α-epoxides, followed by conversion to the 17α-hydroxy compounds according to conventional practices. The resulting esters of 17-hydroxyprogesterone are highly potent progestational agents. It has also been found that the 3-hydroxy-6-alkyl-5,16-pregnadien-20-ones are progestational agents.

The following examples describe the invention in further detail but are not to be construed as limiting in spirit or in scope. Quantities are given in parts by weight.

Example 1

To an ice-cooled solution of 100 parts of diosgenin in 1340 parts of dichloromethane there is added a solution of 160 parts of acetone, 270 parts of dichloromethane, 2 parts of sodium acetate and 75 parts of peroxyacetic acid. After completion of the addition, the mixture is left at room temperature for 5 hours and then washed with 1000 parts of a 5% ferrous sulfate solution which serves to reduce the excess peroxyacetic acid. The organic layer is separated and carefully washed with water. The washings are reextracted with dichloromethane and the combined dichloromethane extracts are taken to dryness on a steam bath. Then 900 parts of heptane are added and a small head fraction is distilled off in order to remove residual dichloromethane. The mixture is cooled to 30° C. under agitation and the crystalline material is collected on a filter. This material consists of a mixture of the α- and β-epoxides; the optical rotation α_D of −120° in chloroform solution indicates predominance of the α-epoxide. The mother liquor is evaporated to a small volume and a second crop is harvested with a rotation $\alpha_D$ of −107°, which is also a mixture of the two epimeric epoxides, but in this crop the β-epoxide predominates. The first crop is dissolved in dichloromethane, treated with 1300 parts of heptane and distilled to remove the dichloromethane. Before all the dichloromethane has been removed the α-epoxide crystallizes. The distillation is continued until the dichloromethane has been completely removed. Filtration yields a stereochemically almost pure 3β-hydroxy-5α,6α-epoxy-22α-allospirostane. A solution of 150 parts of this epoxide in 2700 parts of toluene is added, under anhydrous conditions, to 1500 parts of a 3-molar commercial solution of methylmagnesium bromide. The mixture is refluxed for 150 minutes, after which the flask is cooled in an ice water bath and water is added until the reaction is completed. The toluene is removed by direct steam injection and the residual suspension is cooled. Then a mixture of 400 parts of concentrated hydrochloric acid in 400 parts of water is added in order to dissolve the inorganic material and the crude product is collected on a filter, washed and dried. It is then dissolved in dichloromethane, stirred with activated charcoal and filtered through a bed of filter aid. The clear filtrate is concentrated to a small volume after which methanol is added. The mixture is then concentrated to make certain that all of the dichloromethane has been removed and up to incipient crystallization. Recrystallized from methanol the 6β-methyl-22α-allospirostane-3β,5α-diol melts at about 226.5–230° C. The rotation $\alpha_D$ of a chloroform solution is −85°.

A mixture of 100 parts of this diol with 400 parts of acetic anhydride and 400 parts of pyridine is maintained at 60° C. for 45 minutes, and then is slowly added to water to yield 3β-acetoxy-6β-methyl-22α-allospirostan-5α-ol which, on recrystallization from methanol, melts at about 238–240° C. The rotation $\alpha_D$ in chloroform is −94°.

*Example 2*

To a mixture of 52.5 parts of glacial acetic acid and 2.9 parts of concentrated technical sulfuric acid are added 6.7 parts of 3β-acetoxy-6β-methyl-22α-allospirostan-5α-ol. The mixture is stirred for 1 hour at 50° C. and the resulting deep blue mixture is cooled to 15° C. The product is collected on a filter and becomes colorless after washing with a small amount of methanol. Washing with water yields 6-methyldiosgenin acetate of sufficient purity for the subsequent chromium trioxide degradation of the side chain. However, on recrystallization from dichloromethane, followed by displacement of this solvent by distillation with methanol, there is obtained 6-methyldiosgenin acetate melting at about 217.5–219° C. The rotation $\alpha_D$ of a chloroform solution is −127°.

*Example 3*

Employing the procedure of Example 2, 7 parts of 3β-acetoxy-6β-methyl-22α-allospirostan-5α-ol are reacted with 52.5 parts of acetic acid containing in solution 2 parts of hydrogen chloride. Again 6-methyldiosgenin acetate is obtained in excellent yield.

Again employing the reaction of Example 2, 7 parts of 3β-acetoxy-6β-methyl-22α-allospirostan-5α-ol are reacted with a mixture of 50 parts of technical formic acid and 0.9 part of sulfuric acid to yield 6-methyldiosgenin acetate in excellent yield. Instead of the mixture of formic acid and sulfuric acid there can also be used a mixture of 60 parts of propionic acid and 1.6 parts of sulfuric acid.

*Example 4*

A mixture of 330 parts of 6β-methyl-22α-spirostane-3β,5α-diol and 650 parts of acetic anhydride is stirred and refluxed for 90 minutes. To the resulting suspension are slowly added 1050 parts of glacial acetic acid and 90 parts of water (5 mols) with mild heating and agitation in order to convert the excess acetic anhydride to acetic acid. The suspension is then cooled to 60° C. at which temperature crystallization occurs. Then a solution of 135 parts of sulfuric acid in 1000 parts of glacial acetic acid is added and the mixture is maintained at about 50° C. with vigorous agitation. The blue slurry is cooled to 15° C. and added to a solution of 400 parts of an aqueous solution containing 120 parts of sodium acetate. The sodium acetate serves as a buffer and is added as a safety measure to avoid dark colorization during drying in the event that the crude material is not properly washed.

The crystals are collected on a filter and washed repeatedly with methanol and then resuspended in water, filtered and washed with much water. Drying at 200° C. yields 6-methyldiosgenin acetate melting at about 215–216.5° C. The product is white and of fine crystalline appearance and has been found ideally suitable for subsequent isomerization and degradation without further purification.

*Example 5*

A mixture of 350 parts of 6β-methyl-22α-allospirostane-3β,5α-diol and 600 parts of propionic anhydride is refluxed under agitation for 2 hours after which 1000 parts of propionic acid and 100 parts of water are slowly added under continued agitation. The esterification mixture is cooled to 60° C. and then treated with 135 parts of sulfuric acid and 900 parts of propionic acid. The reaction temperature is maintained at 50° C. for an hour after which the crystalline slurry is cooled to 15° C. Workup as in the preceding example yields 6-methyldiosgenin propionate melting at about 196–198° C. The rotation $\alpha_D$ of a chloroform solution is −126°.

As an alternate procedure 10 parts of crystals are removed from the esterification mixture after cooling to 60° C. and reacted at 50° C. with 60 parts of glacial acetic acid and 3.6 parts of sulfuric acid according to the procedure of Example 2. After filtration, washing and drying, 6-methyldiosgenin propionate is obtained in good yield.

*Example 6*

A solution of 350 parts of 6β-methyl-22α-spirostane-3β,5α-diol is heated at 70° C. with 2150 parts of 90% commercial formic acid for 90 minutes under stirring. The temperature is lowered to 40° C. and a solution of 45 parts of sulfuric acid in 250 parts of formic acid is added. A reaction temperature of 60° C. is maintained for an hour. The mixture is then cooled to room temperature after which a solution of 50 parts of sodium acetate in 500 parts of water is added and the mixture is further cooled to 5° C. under vigorous agitation. The crystals are collected on a filter, washed with water to neutrality and then with a small amount of methanol. The methanol wash effectively removes the residual purple color adhering to the crystals. After drying the 6-methyldiosgenin formate melts at about 213–214.5° C. The rotation $\alpha_D$ of a chloroform solution is −138°.

*Example 7*

6-methyldiosgenin formate described in the preceding example can be prepared with the same efficiency by heating 350 parts of 6β-methyl-22α-allospirostane-3β,5α-diol with 1270 parts of formic acid at 70° C. for 2 hours. When the 3-formate has been formed, 1500 parts of acetic acid containing 130 parts of sulfuric acid are added and the mixture is maintained at 50° C. for an hour. Workup as in Example 4 yields 6-methyldiosgenin formate of the same properties as the compound of the preceding example.

*Example 8*

A mixture of 60 parts of 6-methyldiosgenin acetate and 108 parts of acetic anhydride is heated in a sealed stainless steel tube at 190° C. for 6 hours. The tube is then cooled and the contents are added to 285 parts of 95% glacial acetic acid. Then 15 parts of water are added and the mixture is agitated for 5 minutes at 35° C. After addition of 360 parts of dichloromethane, the mixture is cooled to 9° C. at which temperature a solution of 24.5 parts of chromium trioxide in 45 parts of water and 60 parts of acetic acid is slowly added. The total time to carry out this reaction is about an hour. In the course of this addition the temperature is permitted to rise evenly to 17° C. After completion of the addition, the reaction mixture is stirred for 90 minutes while the temperature is permitted to rise to 26° C. The reaction mixture is shaken vigorously with 500 parts of water and then treated with 100 parts of concentrated aqueous salt solution. Before the aqueous layer is discarded it is reextracted with dichloromethane. The dichloromethane solutions are combined and dried over anhydrous sodium carbonate which also serves to extract the final traces of acetic acid. The drying agent is removed by filtration and washed with dichloromethane. The combined dichloromethane solutions are then filtered through a bed of filter aid to remove suspended chromium salt. The filtrate is freed from solvent by vacuum distillation. The last traces of dichloromethane can be conveniently removed by addition of a small amount of acetone to the initial residue and repetition of the vacuum distillation.

The resulting residue, containing 3β-acetoxy-16β-(δ-acetoxy-γ-methylpentanoyloxy)-6-methyl-5-pregnen-20-one, is dissolved in 240 parts of acetone and added to a solution of 20 parts of sodium hydroxide in 300 parts of water. The mixture is refluxed for 25 minutes, treated with 210 parts of hexane and agitated vigorously while about 115 parts of distillate are removed. Then 10 parts of acetic acid are added and the mixture is cooled with stirring to —5° C., at which temperature a heavy crystalline slurry is obtained. The mixture is maintained at that temperature for several hours to complete crystallization. The crystals are collected on a filter and washed with a 1:1 mixture of acetone and water. The crystals are then suspended in a 10% solution of ether in hexane to remove any oily contaminant. The product is collected on a filter and recrystallized from ether and hexane to yield 3β-hydroxy-6-methyl-5,16-pregnadien-20-one melting at about 176–178° C. The rotation $\alpha_D$ in chloroform is —46°.

Example 9

To a solution of 10 parts of diosgenin acetate in 75 parts of chloroform a solution of 5 parts of peroxyphthalic acid in ether is added at 0° C. After standing at room temperature for 12 hours the phthalic acid formed is removed by filtration and washed with water to neutrality. The washings are reextracted with chloroform and the combined chloroform solutions are concentrated almost to dryness. Addition of 50 parts of methanol followed by concentration ot about half of the initial volume yields 3β-acetoxy-5α,6α-epoxy-22α-spirostane.

A solution of 4 parts of this product in 53 parts of benzene is cooled to 0° C. and then treated with 30 parts of a 3-molar solution of ethylmagnesium bromide in ether by slow addition. The resulting solution is refluxed for 8 hours, cooled and treated slowly with water under efficient cooling and agitation. The resulting precipitate is caused to dissolve by addition of a 5% solution of sulfuric acid. The organic layer is separated and washed with water to neutrality. The aqueous phases can be reextracted with ether to improve the yield. The organic solution is taken to dryness to yield 6β-ethyl-22α-allospirostane-3β,5α-diol.

A mixture of 1 part of this diol with 5 parts of acetic anhydride and 5 parts of pyridine is maintained at room temperature for 5 hours, and then poured in ice water. After decomposition of the acetic anhydride, the precipitate is collected on a filter and washed with water. Seven parts of 3β-acetoxy-6β-ethyl-22α-allospirostan-5α-ol are added to a solution of 2.9 parts of concentrated sulfuric acid in 52.5 parts of glacial acetic acid. The mixture is heated with agitation and the temperature is maintained at 50° C. for one hour. The mixture is then cooled to room temperature, the precipitate is collected on a filter and washed first with a small amount of methanol and then with water to neutrality. After drying, one part of the 6-ethyldiosgenin acetate thus produced is suspended in 32 parts of methanol and heated to reflux. A solution of 0.25 part of potassium hydroxide in 1 part of water is added and the mixture is refluxed for 45 minutes. It is then neutralized with acetic acid, cooled, filtered and washed with a small amount of methanol to yield 6-ethyldiosgenin in colorless needles.

A solution of 62 parts of 6-ethyldiosgenin is then heated with 105 parts of acetic anhydride in a sealed stainless steel tube at 190° C. for 6 hours. The reaction mixture is further treated as in Example 8 to yield 3β-hydroxy-6-ethyl-5,16-pregnadien-20-one in white prismatic crystals. The infrared absorption spectrum shows maxima at 2.76, 6.0, 6.3 and 7.3 microns.

Example 10

The residue of Example 8, containing 3β-acetoxy-16β-(δ-acetoxy-γ-methylpentanoyloxy)-6-methyl-5-pregnen-20-one, is dissolved in 260 parts of acetone and cooled to 20° C. at which temperature it is treated with a solution of 14 parts of sodium hydroxide in 320 parts of water. The mixture is agitated at about 25° C. for 20 minutes after which 10 parts of acetic acid are added and the mixture is cooled to 0° C. The resulting yellowish crystals are washed with a 1:1 mixture of acetone and water and air dried. The crude 3β-acetoxy-6-methyl-5,16-pregnadien-20-one thus obtained is suitable for direct use in the subsequent procedures. On recrystallization by dissolving in acetone and slow addition of water there is obtained 3β-acetoxy-6-methyl-5,16-pregnadien-20-one melting at about 122–123.5° C. The rotation $\alpha_D$ of a chloroform solution is —58°.

In lieu of dichloromethane in the procedures of Examples 8 and 10, 1,2-dichloroethane can be advantageously used. In that case no refrigeration of the condenser is needed for complete recovery of the chlorinated solvent. In tropical locations where the cooling water often has a temperature of 30° C. or higher, the reaction can be carried out advantageously by using the even higher boiling dichloropropane; this permits complete recovery of the chlorinated solvent without excessive consumption of cooling water, refrigeration of the water, or enlargement of the cooling surface of the condenser.

Example 11

To a solution of 10 parts of crude 3β-acetoxy-6-methyl-5,16-pregnadien-20-one (melting at about 115–120° C.) in 160 parts of acetone there are added 120 parts of water containing 4 parts of sodium hydroxide. The mixture is heated under reflux for 30 minutes, then neutralized by addition of 4 parts of acetic acid and chilled. The resulting precipitate is collected on a filter and washed with a small amount of a 1:1 mixture of acetone and water to yield 3β-hydroxy-6-methyl-5,16-pregnadien-20-one melting at about 176–178° C.

Example 12

6-methyldiosgenin formate is substituted for the acetate as used in Example 8 to yield the crude 3β-formyloxy-16β-(δ-acetoxy-γ-methylpentanoyloxy)-6-methyl-5-pregnen-20-one. This compound is then dissolved in 300 parts of acetone and treated with 14 parts of sodium hydroxide in 400 parts of water, care being taken that the temperature does not rise above 22° C. The mixture is maintained at 20–22° C. for 30 minutes, treated with 10 parts of acetic acid and chilled. The resulting crystals are collected on a filter and washed with a 1:1 mixture of acetone and water to yield 3β-formyloxy-6-methyl-5,16- pregnadien-20-one in prismatic needles melting at about 149.6–151° C. The rotation α_D of a chloroform solution is —62.5°.

The same ester is prepared by heating 1 part of 3β-hydroxy-6-methyl-5,16-pregnadien-20-one in 7 parts of 90% formic acid at 65° C. for 2 hours, pouring the reaction mixture into water and recrystallization of the precipitate from acetone.

*Example 13*

A solution of 50 parts of 3β-hydroxy-6-methyl-5,16-pregnadien-20-one in 2400 parts of methanol is treated at room temperature with 18 parts of sodium hydroxide in 100 parts of water and 180 parts of 35% hydrogen peroxide. This mixture is kept at room temperature for 24 hours and then poured into water. The resulting precipitate is extracted with chloroform. The chloroform solution is washed with water, dried over anhydrous sodium sulfate and evaporated almost to dryness. The resulting residue is collected on a filter and recrystallized from a mixture of acetone and ether to yield 3β-hydroxy-6 - methyl - 16α,17α - epoxy -5- pregnen-20-one melting at about 182–184° C.

A solution of 50 parts of this epoxide in 900 parts of anhydrous toluene is treated with 350 parts of cyclohexanone and a solution of 25 parts of aluminum isopropoxide in 300 parts of toluene. The mixture is refluxed for 30 minutes, cooled and poured into ice water. The lower aqueous layer is separated, acidified with dilute sulfuric acid and reextracted with benzene. The combined extracts are steam distilled and the residue is extracted with ether. The ether solution is washed with water, dried over anhydrous sodium sulfate, filtered and taken to dryness. The residue is chromatographed over alumina. Elution with a 1:1 solution of hexane in benzene yields 6α-methyl - 16α,17α - epoxy-4-pregnene-3,20-dione. This epoxide is reacted with an excess of hydrogen bromide in acetic acid solution at room temperature for 30 minutes. The mixture is then poured into ice water and the bromohydrin is collected on a filter. After drying, it is refluxed for 2 hours in methanol solution with twice its weight of Raney nickel. The Raney nickel is removed by filtration and the methanol solution is evaporated to dryness. The residue crystallizes in colorless needles. Recrystallization from aqueous acetone yields 6α-methyl-17α-hydroxyprogesterone melting at about 211–213° C.

What is claimed is:

1. The process for the preparation of a member of the class consisting of 3β-hydroxy-6-methyl-5,16-pregnadien-20-ones and their 3-acylates wherein the 3-acyl group is derived from a lower alkanoic acid of less than 7 carbon atoms, which comprises contacting a 3-acyloxy-26-acetoxy-6-methyl-5,20(22)-furostadiene in which the acyl group is derived from a lower alkanoic acid of less than 7 carbon atoms with a chromium trioxide-acetic acid medium containing therein from 15–60% by volume of a chloroalkane of one to three carbon atoms, thereafter contacting the resulting 3-acyloxy-16-(δ-acetoxy-γ-methylpentanoyloxy)-5-pregnen-20-one with a solution of at least 3 mols of alkali in aqueous acetone at a temperature in the range of 20° C. to about 65° C.

2. The process for the preparation of a compound of the structural formula

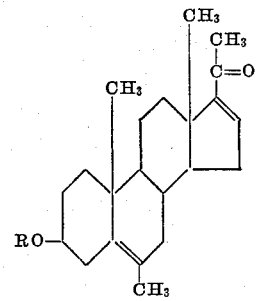

wherein R is a member of the class consisting of hydrogen, HCO—, and (lower alkyl)-CO— radicals, which comprises contacting a compound of the structural formula

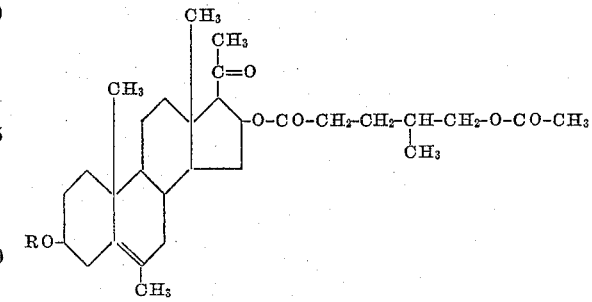

with a solution of at least 3 mols of alkali in aqueous acetone at a temperature substantially in the range of 20° C. to 65° C.

3. The procedure for the preparation of 3β-hydroxy-6-methyl-5,16-pregnadien-20-one which comprises contacting a member of the group consisting of 3β-acetoxy-6-methyl-5,16-pregnadien-20-one and 3-acetoxy-6-methyl-16-(δ - acetoxy-γ-methylpentanoyloxy)-5-pregnen-20-ones with a solution of at least 3 mols of alkali in aqueous acetone at a temperature in the range of about 45–65° C.

4. The process for the preparation of 3β-hydroxy-6-methyl-5,16-pregnadien-20-one which comprises contacting a compound selected from the group consisting of 3β-acetoxy-6-methyl-16-(δ-acetoxy - γ - methylpentanoyloxy)-5-pregnen-20-one and 3β-acetoxy - 6 - methyl-5,16-pregnadien-20-one with an alkaline acetone-water mixture having an alkali content of 1–20% by weight and an acetone to water ratio in the range of about 3:1 to 1:3 in a temperature range of about 45–65° C.

5. The procedure for the preparation of a lower alkanoic acid ester of 3β-hydroxy-6-methyl-5,16-pregnadien-20-one which comprises contacting the corresponding lower alkanoic acid ester of 3β-hydroxy-6-methyl-16-(δ-acetoxy-γ-methylpentanoyloxy)-5-pregnen-20-one with a solution of at least 3 mols of alkali in aqueous acetone at a temperature in the range of 20° to 35° C.

References Cited in the file of this patent

UNITED STATES PATENTS 2,352,851    Marker et al. _____ July 4, 1944